Nov. 30, 1954  H. E. HIPPS ET AL  2,695,607
SELF-RETAINING BONE RETRACTOR
Filed April 24, 1951  2 Sheets-Sheet 1
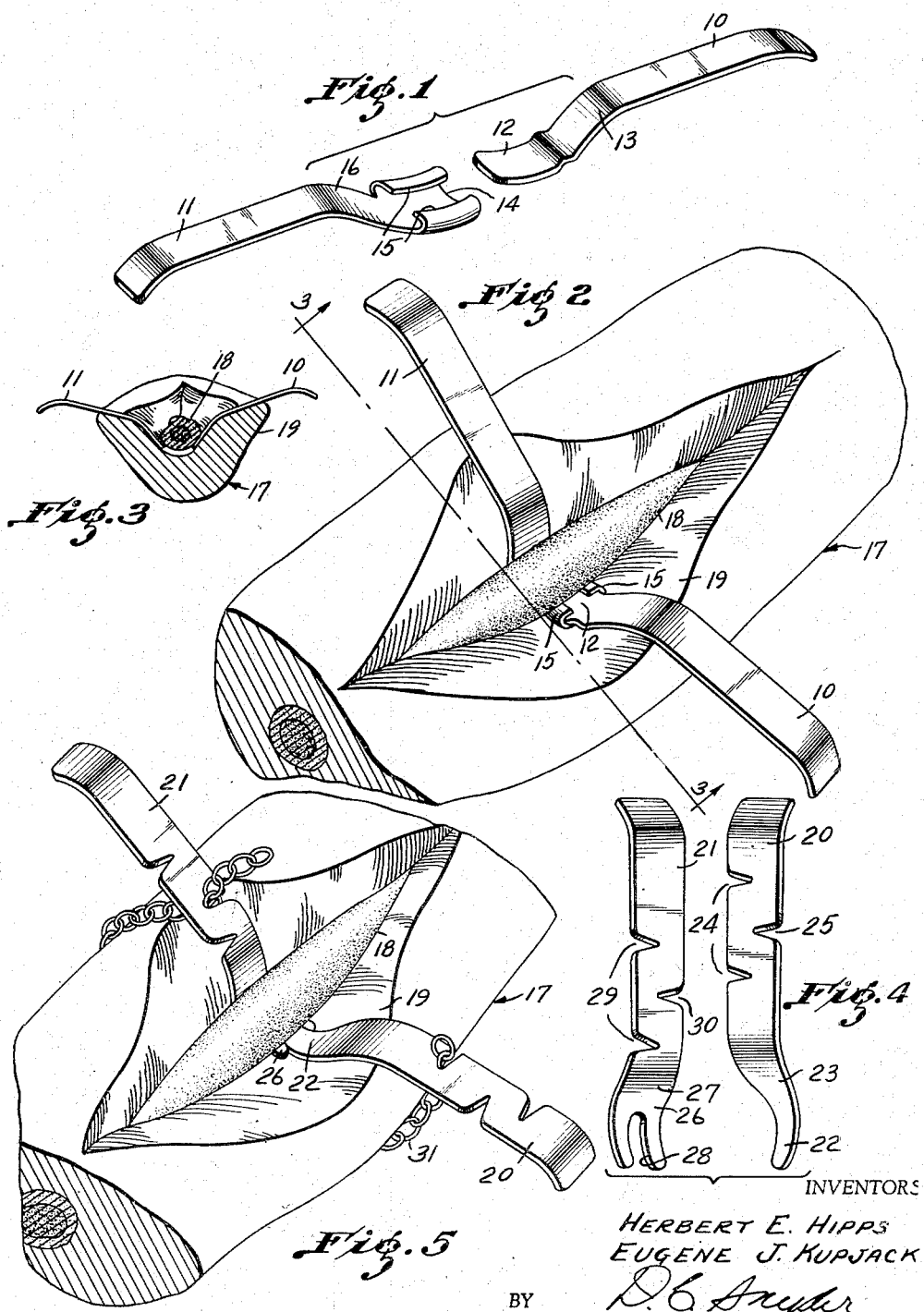
INVENTORS
HERBERT E. HIPPS
EUGENE J. KUPJACK
BY
ATTORNEY

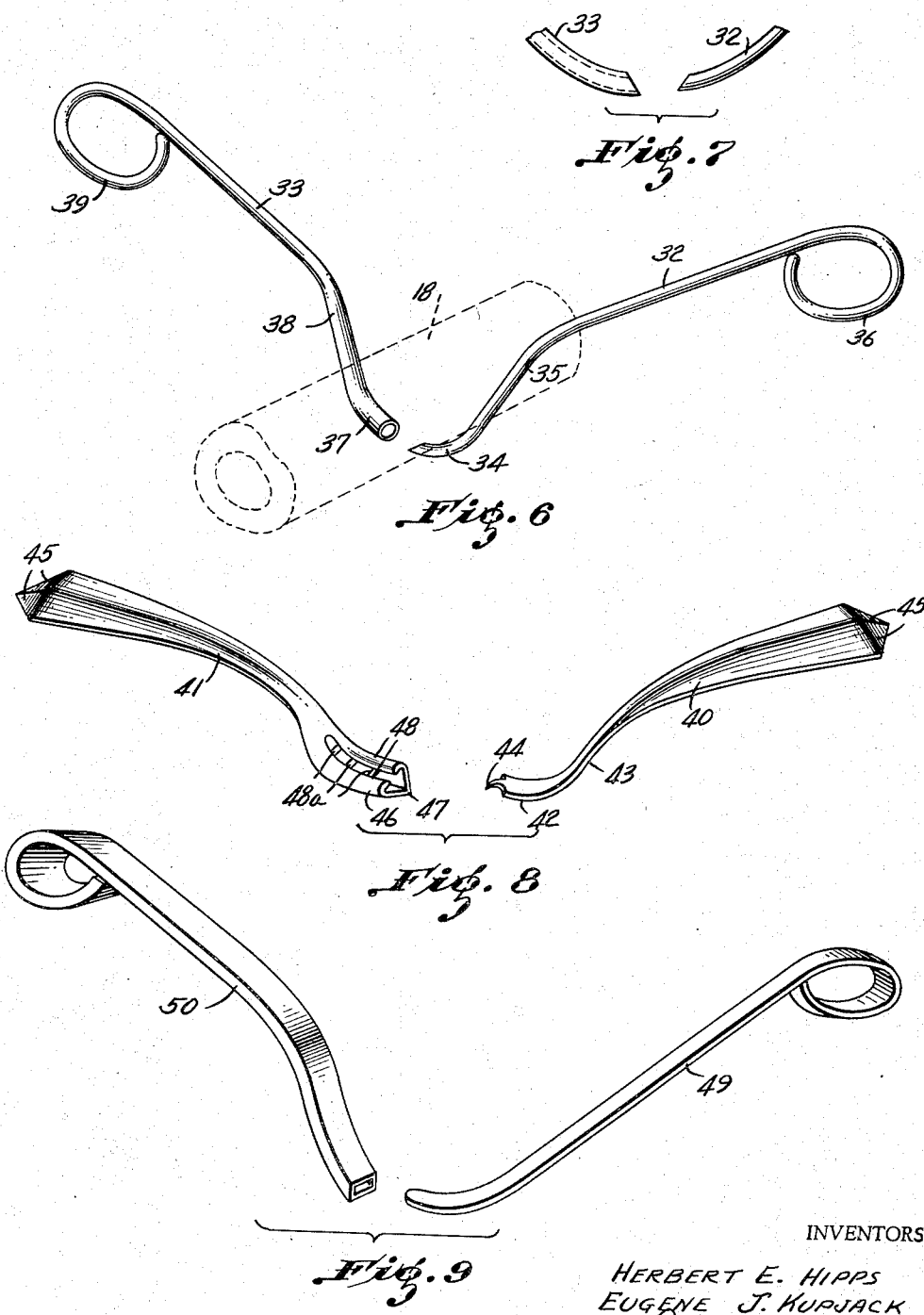

United States Patent Office

2,695,607
Patented Nov. 30, 1954

2,695,607

SELF-RETAINING BONE RETRACTOR

Herbert E. Hipps, Waco, Tex., and Eugene J. Kupjack, Park Ridge, Ill.

Application April 24, 1951, Serial No. 222,716

17 Claims. (Cl. 128—20)

This invention relates to a surgical retractor. More specifically it relates to a retractor that will serve to hold back flesh and muscles from a bone upon which surgical treatment is to be performed.

An object of the present invention is to provide an improved retractor that is easily applied and effectively exposes a bone upon which surgery is to be performed.

Another object is the provision of a surgical retractor that is formed of a plurality of members that can be easily applied, connected to one another in a manner that assures a high degree of access of a body part to be surgically treated.

A further object is to provide a surgical retractor formed of separate members for easy application to and removal from a body part, the members being connected in place on the body part in a suitable joint insuring effective retraction.

Other objects and many of the attendant advantages of this invention will be readily appreciated as the same becomes better understood by reference to the following detailed description when considered in connection with the accompanying drawings wherein:

Fig. 1 is a perspective view of one form of the surgical retractor of the present invention;

Fig. 2 shows the retractor of Fig. 1 applied to a body part to be treated;

Fig. 3 is a sectional view taken on the line 3—3 of Fig. 2;

Fig. 4 is a view of a second form of a retractor.

Fig. 5 shows the retractor of Fig. 4 applied to a body part to be treated;

Fig. 6 shows a third form of a surgical retractor being applied to a bone;

Fig. 7 is a view showing the ends of the component members of the surgical retractor of Fig. 6.

Fig. 8 shows a fourth form of surgical retractor; and

Fig. 9 shows a fifth form of retractor.

In Fig. 1 the surgical retractor is formed of two members 10 and 11. The member 10 has an offset end 12 joined in a curved portion 13 with the remainder of the member 10. The member 11 has an offset end 14 provided with inwardly directed flanges 15. The end 14 is joined with the rest of the member 11 in a curved portion 16.

In Fig. 2 a body part 17 such as an arm is cut open and a bone 18 is bared. Now the members 10 and 11 are applied below the opposite sides of the bone 18, ends 12 and 14 being inserted between the bone 18 and the associated body mass 19 in the member 17 such as flesh and muscle. The end 12 is inserted within the flanges 15 of the end 14, and the retractor members 10 and 11 are thus securely assembled upon one another. The retractor members cannot pivot with respect to one another about their ends and thus are maintained in contact with the associated body mass 19, holding it retracted from the bone 18. Access is had to the bone over more than a half its circumference, and whatever surgery is needed is performed on the bone. After completion of the surgery the retractor members 10 and 11 are easily separated from one another and removed from the body part 17 by being pulled in opposite directions away from the bone.

In Fig. 4 the surgical retractor comprises cooperating members 20 and 21. The member 20 has an offset end 22 formed as a tongue of somewhat reduced width joined to the rest of the member 20 by a curved portion 23. Member 20 has two slots 24 on one edge and a slot 25 between the slots 24 in the opposite edge. The member 21 has an offset end 26 joined to the rest of the member 21 in a curved portion 27 and provided with a slot 28. One edge of the member 21 has spaced slots 29 and the other edge a slot 30 between the slots 29. The retractor members 20 and 21 of Fig. 4 are applied to the body member 17 in much the same manner as the retractor of Fig. 1 is shown to be applied in Fig. 2. The offset ends 22 and 26 are inserted from opposite sides of the bone 18 between it and the associated body mass 19 with the reduced tongue 22 entering the slot 28 beneath the bone. A flexible connector in the form of a chain 31 is wrapped around the body member 17 and inserted in appropriate edge slots 29, 30 and 24, 25 in the members 20 and 21. Thus the chain holds the members 20 and 21 down in retracting contact with the body mass 19, and the bone 18 is suitably exposed for surgical treatment. After the treatment the retractor members are easily disassembled and withdrawn from the body member by being pulled in opposite directions after removal of the chain 31.

In Fig. 6 the surgical retractor is formed of members 32 and 33. 32 is a rod having an offset end 34 joined by a curved portion 35 with the remainder of the member 32 and a loop 36 at the other end, which may serve as a handle or finger hold. Member 33 is a hollow rod with an offset end 37 joined to the rest of the rod 33 by a curved portion 36 and a loop 39 at the other end, which may also serve as a handle or finger hold. The faces on the offset end 34 and 37 oblique to the direction of the ends, as seen in Fig. 7, whereby insertion of the end 34 in the hollow end 37 is facilitated when the retractor members 32 and 33 are applied to a body part. They are adapted to go beneath the bone 18 as indicated in Fig. 6, and to hold back the associated body mass not shown.

In Fig. 8 the retractor comprises members 40 and 41. The member 40 has an offset end 42 joined to the body of the member 40 by a curved portion 43. A reduced tip or tongue 44 on the end 42 is formed as a slight blunt hook. The body of the member 40 is angular in section and increases in size in a direction away from the end 42. The end of the body of each member is formed with angularly related faces 45. The member 41 has a body of similar shape to the member 40 with end faces 45. The member 41 has an offset end 46 formed as a V-shaped channel 47 with inwardly directed flanges 48, and provided with a plurality of indentations 48a in the base. Retractor members 40 and 41 are applied as indicated for the forms of tools as indicated in Figs. 2 and 5, the reduced tip 44 entering the channel 47. The hooked end 42 snaps into each indentation successively as the members 40 and 41 are brought together. By hearing or feeling the hook snap into the indentations, the surgeon knows the relative position of the members. If the members 40 and 41 are smaller for retracting smaller bones, one indentation may be sufficient instead of the three shown. The members 40 and 41 upon being so assembled are firmly held against relative movement thus effectively hold the body mass away from the bone that is to be surgically treated. The V-shaped channel 47 on the end of the retractor member 41 permits easy cleaning after use and simplifies manufacture of the member.

In Fig. 9 the retractor is formed to members 49 and 50, which are similar respectively to the rods 32 and 33 of Fig. 6 except that the member 49 has a flat rectangular section and the member 50 is a rectangular tube appropriately shaped to receive the ends of the member 49. The adjacent ends of the members 49 and 50 are curved and offset and the other ends are looped as in the modification of Figs. 7 and 8 for the same reasons. When the members 49 and 50 are applied to the body part to be treated, the end of the member 49 is inserted in the end of the member 50 beneath the bone upon which surgery is to be performed. Thus a firm connection of the members is assured, and the parts can be easily separated after surgery is over.

The advantages of each of the modifications described in the foregoing are many. The retractor members are self-retaining through being firmly joined to one another when applied to the body part to be treated. The connection is such as to provide an effective retraction of the muscles, and more than half of the circumference of the bone is exposed. The retractor members are easily separated after the surgery is completed. The members may be formed of metal, and this permits sterilizing by boiling or autoclaving.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

We claim:

1. A retractor comprising a pair of members having separate complementary ends interfitting at said ends upon insertion from opposite sides under a bone and between a bone and associated body masses to be retracted from the bone, the members having notches, and a chain engaging the notches and adapted to extend tightly about the body mass so as to make the members press the body substance back from opposite sides of the bone.

2. The retractor specified in claim 1, each member having a plurality of notches alternately positioned at opposite edges of the members, each notch being adapted to receive the chain, whereby the retractor is adapted for use with body masses of different sizes.

3. A retractor comprising a pair of members having separate opposed and complementary ends interfitting at said ends upon insertion from opposite sides beneath a bone, and the ends having an interengaging connection preventing pivoting of the members toward one another about their interfitting ends and thereby adapting the members to press associated body mass away from the bone.

4. A retractor comprising members having mating ends adapted to fit together between a bone and a body mass by insertion from opposite sides of the bone, the members being interengaged to extend in opposite directions from the mating ends so as to lie against the body mass and retract it from the bone, the mating ends fitting tightly together in such a way as to prevent any relative movement of the members which involves movement of the members away from the mass.

5. A retractor comprising a pair of members having offset ends, the offset end of one member having a reduced tip, the offset end of the other member having a flanged channel, whereby the members may be applied from opposite sides of a bone to retract associated body mass from the bone and to insert the reduced tip in the flanged channel, between the bone and the body mass in an engagement that prevents movement of the members away from the retracted body mass.

6. A retractor comprising a pair of members having mating ends, one mating end being formed as a tongue, the other being formed as a flanged channel, whereby the members may be applied together at said ends from opposite sides of a bone to retract associated body mass from the bone and to insert the tongue in the flanged channel fitting one another so as to hold the members with respect to one another and thereby to maintain them in retracting contact with the body mass.

7. A retractor comprising a pair of members having complementary ends fitting together at said ends upon insertion from opposite sides of a bone between the bone and associated body mass to be retracted, the one complementary end being hollow so as to receive the other in an engagement such as to hold the members with respect to one another and thereby to hold them in retracting contact with the body mass.

8. A retractor comprising a pair of members having offset ends, one being hollow so as to receive the other offset end between bone and associated body mass upon application of the members from opposite sides of the bone, the engagement of the offset ends with one another holding the members against relative movement and maintaining them in retracting engagement with the body mass.

9. A retractor comprising a pair of members having complementary ends engaging one another at said ends between a bone and associated body mass upon application of the members from opposite sides of the bone, one complementary end having flanges so as to receive the other complementary end in a rigid engagement such as to prevent relative pivoting of the members and thereby to maintain them in retracting engagement with the body mass.

10. A retractor comprising a pair of members having complementary ends, one having a slot and the other a tongue, the tongue and slot being adapted to engage one another at said ends between a bone and associated body mass upon application of the members from opposite sides of the bone, and means connecting the members at regions spaced from the complementary ends and pressing around the body mass so as to maintain the members in retracting contact with body mass.

11. A retractor comprising a pair of members having offset ends, the offset end of one member having a reduced hooked tip, the offset end of the other member having a flanged channel carrying an indentation, whereby the members may be applied from opposite sides of a bone to retract associated body mass from the bone and to insert the reduced hooked tip in the flanged channel between the bone and the body mass, the hooked tip snapping into the indentation in the channel.

12. A retractor comprising a pair of members having offset ends, the offset end of one member having a reduced hooked tip, the offset end of the other member having a channel carrying a plurality of indentations, whereby the members may be applied from opposite sides of a bone to retract associated body mass from the bone and to insert the reduced hooked tip in the flanged channel, the hooked tip snapping successively into the indentations in the channel to indicate the assembly of the members on one another, the hooked tip finally fitting in the indentation farthest from the very end of the channel so as to hold the members to one another.

13. A bone retractor comprising a pair of members having separate complementary interfitting ends, said complementary ends being offset from the rest of the members and adapted to be slid between an exposed bone and the soft tissue beneath from opposite sides of the bone with the rest of the respective members extending up and over the upper surface of the body portion adjacent an exposed bone.

14. A bone retractor comprising a pair of oblong body members having respective handle portions at one end adapted to be grasped by the fingers of an operator and respective offset portions at the other end joining the main associated body portion by a smooth curved portion, said offset ends having separate complementary interfitting ends whereby said members may be readily slid under an exposed bone from opposite sides thereof.

15. A bone retractor comprising a pair of members having separate complementary interfitting ends which are offset from the rest of the members, the offset ends being curved and sized to extend around and under an exposed bone between the body masses immediately surrounding the bone and the outer bone surface.

16. A bone retractor comprising a pair of oblong body members having respective handle portions at one end adapted to be grasped by the fingers of an operator and respective offset portions at the other end joining the main associated body portion by a smooth curved portion, said offset ends having separable complementary interfitting ends, said offset ends being curved and sized to extend around and under an exposed bone between the body masses immediately surrounding the bone and the outer bone surface.

17. The combination of claim 14 characterized further by said interfitting ends including means to prevent any substantial movement of the members toward each other about their interfitting ends to ensure the pressing of adjacent body masses away from the bone.

References Cited in the file of this patent

FOREIGN PATENTS

| Number | Country | Date |
| --- | --- | --- |
| 350,214 | France | Oct. 9, 1905 |

OTHER REFERENCES

The Journal of Bone and Joint Surgery for October 1939, p. 1047. (Copy in Division 55.)

The Journal of Bone and Joint Surgery for July 1950, p. 700. (Copy in the Scientific Library.)